United States Patent [19]

Cassada

[11] 4,376,932
[45] Mar. 15, 1983

[54] MULTI-REGISTRATION IN CHARACTER RECOGNITION

[75] Inventor: Thomas E. Cassada, Lexington, Ky.

[73] Assignee: International Business Machines Corporation, Armonk, N.Y.

[21] Appl. No.: 164,130

[22] Filed: Jun. 30, 1980

[51] Int. Cl.³ .............................................. G06K 9/68
[52] U.S. Cl. ....................................... 382/44; 382/65
[58] Field of Search ............. 340/146.3 Q, 146.3 AQ, 340/146.3 R, 146.3 MA, 146.2, 146.3 H; 364/515, 571, 728, 731, 819, 820; 358/105, 108, 109, 163; 356/388, 394, 398

[56] References Cited

U.S. PATENT DOCUMENTS

| 3,152,318 | 10/1964 | Swift | 340/146.3 Q |
|---|---|---|---|
| 3,435,244 | 3/1969 | Burckhardt et al. | 340/146.3 Q |
| 3,576,534 | 8/1969 | Steinberger | 340/146.3 Q |
| 3,593,286 | 11/1968 | Altman | 340/146.3 Q |
| 3,601,802 | 8/1971 | Nakagome et al. | 340/146.3 Q |
| 3,613,082 | 10/1971 | Bouchard | 340/146.3 MA |
| 3,614,736 | 10/1971 | McLaughlin et al. | 340/146.3 Q |
| 3,727,183 | 4/1973 | Lemay | 340/146.3 Q |
| 3,878,509 | 4/1975 | Kikuchi et al. | 340/146.3 MA |
| 3,883,848 | 5/1975 | Minck et al. | 340/146.3 H |
| 4,027,284 | 5/1977 | Hoshino et al. | 340/146.3 AQ |
| 4,034,343 | 7/1977 | Wilmer | 340/146.3 MA |
| 4,200,861 | 4/1980 | Hubach et al. | 340/146.3 AQ |
| 4,308,523 | 12/1981 | Schapira | 340/146.3 Q |

Primary Examiner—Leo H. Boudreau
Attorney, Agent, or Firm—John A. Brady

[57] ABSTRACT

Optical character recognition in which registration of a stored, character image is changed from, for example, center to lower left depending on the individual character template or equivalent description against which the image is being compared. Accuracy is improved because the registration form used is one known to provide the greatest elements distinguishing the character of the template from the closest other character which might be presented.

12 Claims, 11 Drawing Figures

T = TOP　　　　L = LEFT
C = CENTER　　R = RIGHT
B = BOTTOM　　M = MIDDLE
NOTATION EXAMPLES:
　　　TM = TOP MIDDLE
　　　BL = BOTTOM LEFT

CAPITAL I TO NUMERAL 1 SEPARATION
FOR CENTER REGISTRATION
29 POINTS DIFFERENT

CAPITAL I TO NUMERAL 1 SEPARATION
FOR TM REGISTRATION
61 POINTS DIFFERENT

FIG. 10.

MULTITREE WITH MULTIREGISTRATION

CALCULATE TOP, BOTTOM, LEFT, RIGHT EXTREMITIES OF UNKNOWN CHARACTER IN RV

↓

DEFINE REGISTRATION POINTS
|     | VERTICAL        | HORIZONTAL |
|-----|-----------------|------------|
| BL =| BOTTOM          | LEFT       |
| TR =| TOP             | RIGHT      |
| ML =| (TOP+BOTTOM)÷2  | LEFT       |

↓

MOVE CHARACTER FROM RV TO VB WITH BL ALIGNED WITH LOWEST, LEFT MOST POINT IN VB

↓

EXECUTE TREE SEQUENCE TREE #1 - SAVE RESULTS  — REFER TO FIG. 11.

↓

MOVE CHARACTER TO VB WITH TR ALIGNED WITH HIGHEST, RIGHT MOST POINT IN VB

↓

EXECUTE TREE SEQUENCE TREE #2 - SAVE RESULTS

↓

MOVE CHARACTER TO VB WITH ML ALIGNED WITH LEFT MOST, VERTICAL MID POINT IN VB

↓

EXECUTE TREE SEQUENCE TREE #3 - SAVE RESULTS

↓

READ FROM STORAGE TABLE THE SEPARATION VALUES FOR EACH TREE AS FUNCTION OF CHARACTER IDENTIFIED

↓

MODIFY TREE CONFIDENCE VALUES BY SEPARATION VALUES

↓

CALCULATED WEIGHTED CONFIDENCE LEVEL OF TREE RESULTS

↓

CONFIDENCE ADEQUATE — Y → VALID CHARACTER RECOGNITION — N → REJECT CHARACTER

MULTI-REGISTRATION IN CHARACTER RECOGNITION

DESCRIPTION

TECHNICAL FIELD

This invention relates to character recognition in high-speed electronic, optical systems, and more specifically, relates to techniques to improve accuracy during the comparing of an image with a reference template or the equivalent.

BACKGROUND ART

Optical character recognition devices of the type to which this invention relates, including the preferred embodiment described below, are within the state of the art and publicly known in various forms, except for the registration techniques upon which the invention herein is based.

In such systems a visual character, generally inscribed in ink or pencil on paper, is examined by a photoconductor. Typically, this optical examination will be by a line of photoconductors. At electronic speeds this image is digitized, stored in data processing memory as a binary pattern corresponding to the image, analyzed for registration information such as the extreme lower left point, and compared against a separate template or some equivalent for identification of the characters to be recognized.

Various known systems register the pattern at lower left, center, top right, top left, center of density, and other consistently identifiable points. Each of these known systems uses one form of registrations in its comparison against all of the templates or other recognition models. The invention disclosed and claimed here differs fundamentally from known prior art in that the registration point is varied for different identification models compared against an image being identified.

It is known to make multiple comparisons of an image against models for one character and to adjust the registration slightly for each comparison. Such adjustment is to give an average registration from one perspective. In accordance with this invention, the perspective itself is changed.

Improved accuracy is a basic design criterion in current optical character recognition systems. The theoretical differences in character forms are often obscured in practice by smears, dirt, aberrations and peculiarities of inscription, physical damage to the writing, and any one or combination of these and any of the other possible similar influences and imperfections too numerous to attempt to categorize. For such reasons characters which differ clearly when considered ideally may, when viewed in practice, appear substantially similar when compared in a character recognition device against a template or other recognition model. In fact, because of such uncertainties in practice, standard technique in the art requires more than minimal conformance to an identification model before a character is considered recognized or rejected.

DISCLOSURE OF INVENTION

It is, accordingly, an object of this invention to improve the accuracy of optical character recognition devices.

It is, similarly, an object of this invention to provide registration modification techniques which improve accuracy of otherwise known electronic character recognition devices.

In accordance with this invention, a character recognition device is structured to observe the image in memory from at least two registration perspectives, which may be, for example, center of bottom left. When a different identification model is used to recognize each character, the registration perspective employed for each recognition model depends upon the character for which it is the model. The perspective used is the one which provides greater accuracy for images occurring in actual practice.

When the character recognition system employs comparison of multiple, different identification models to recognize the same character, this invention also encompasses the use of different registration perspectives for such different models, the results of such multiple comparisons at different perspective are then weighted in accordance with the degree of separation from the most similar image which might be presented when presented in that perspective.

BRIEF DISCLOSURE OF THE DRAWINGS

FIG. 2 is a similar drawing illustrating the elements of difference on two images registered at their center.

FIG. 3 is the same as FIG. 2 except it shows the images registered at top middle.

Figure 6:
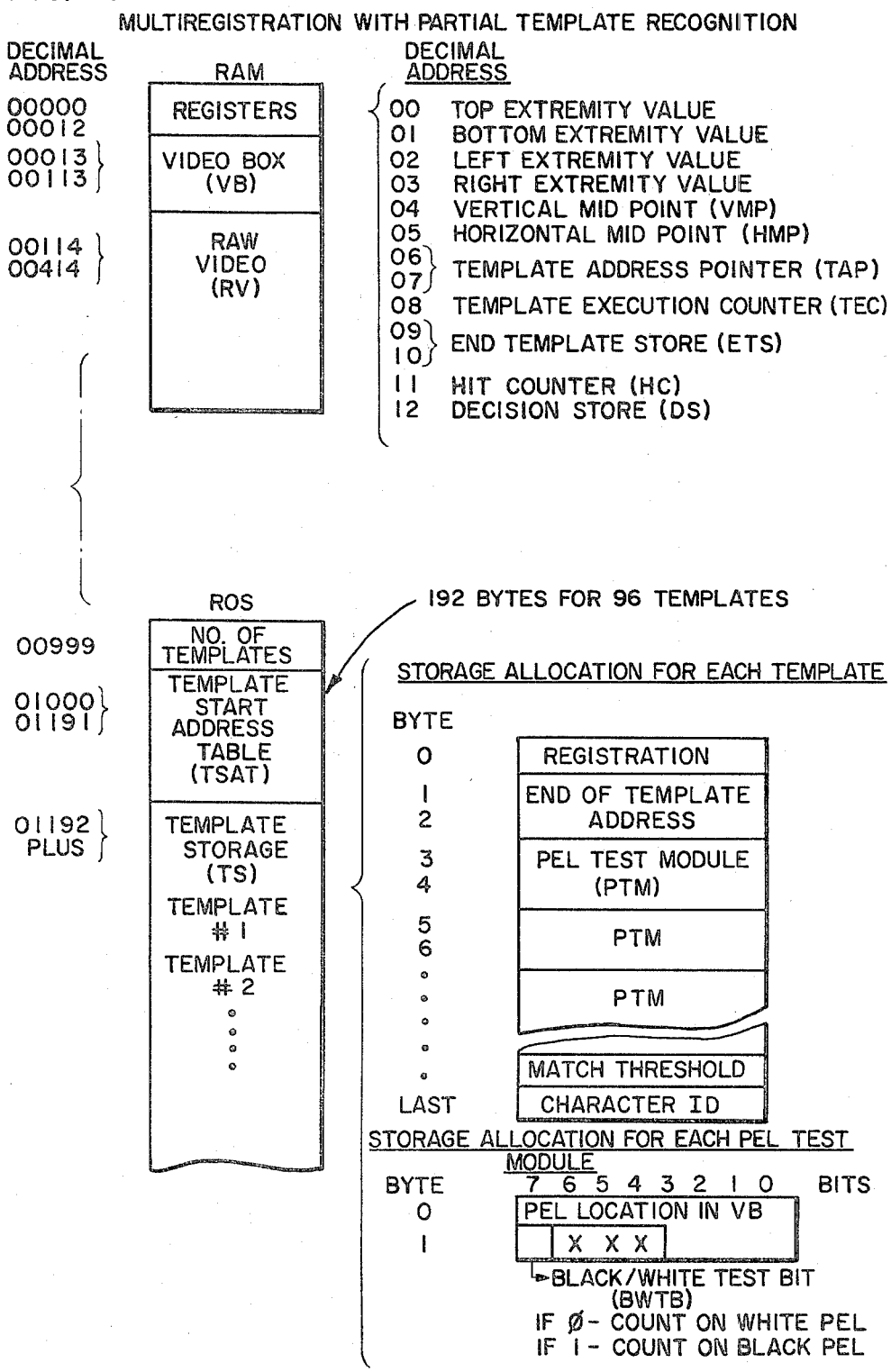

FIG. 6 describes memory allocation and address information for the partial template implementation.

Figure 7:
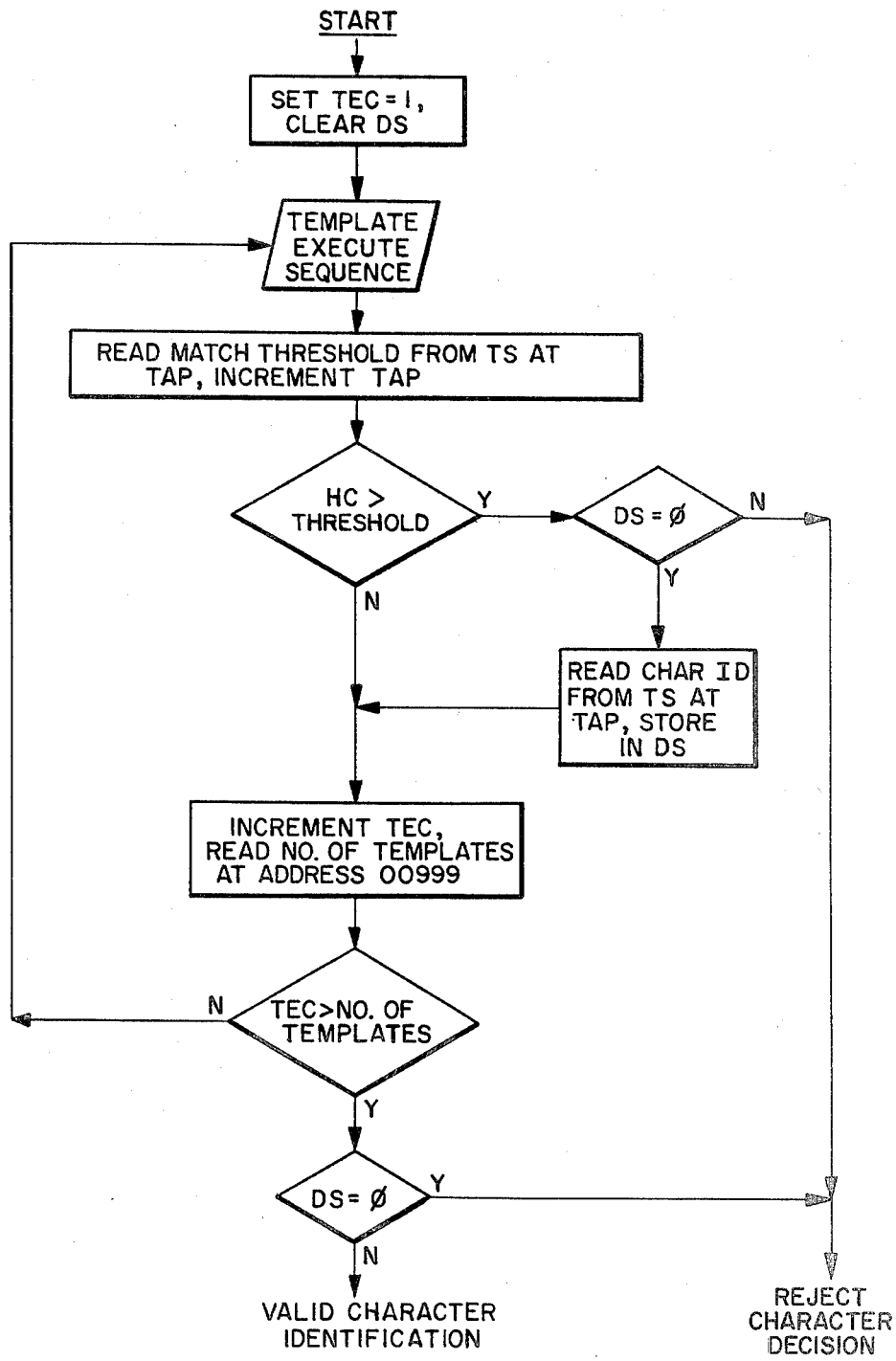

FIG. 7 is a flow diagram of the partial template implementation.

Figure 8:
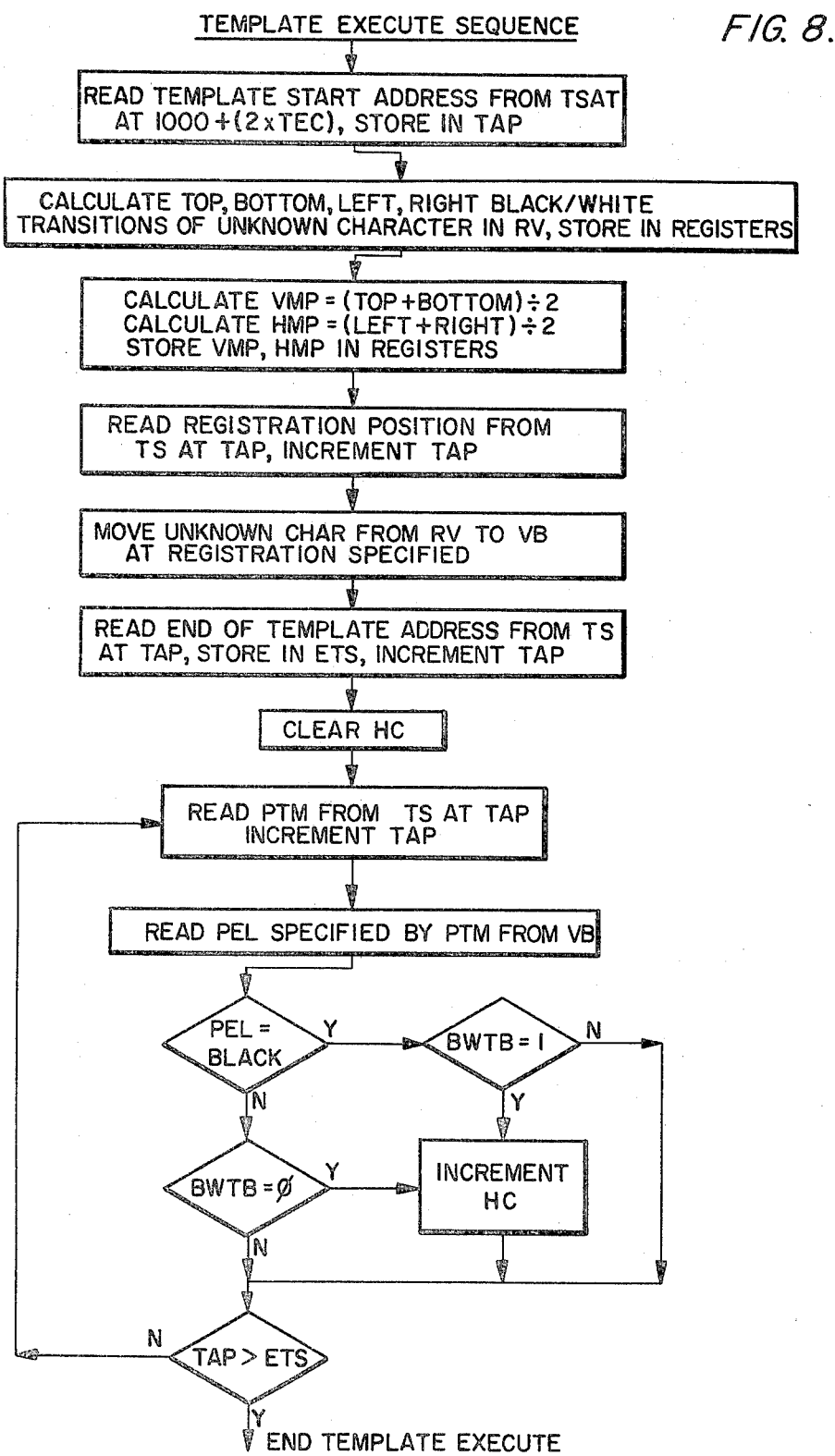

FIG. 8 is a flow diagram of the template execute sequence employed in the partial template implementation.

Figure 9:
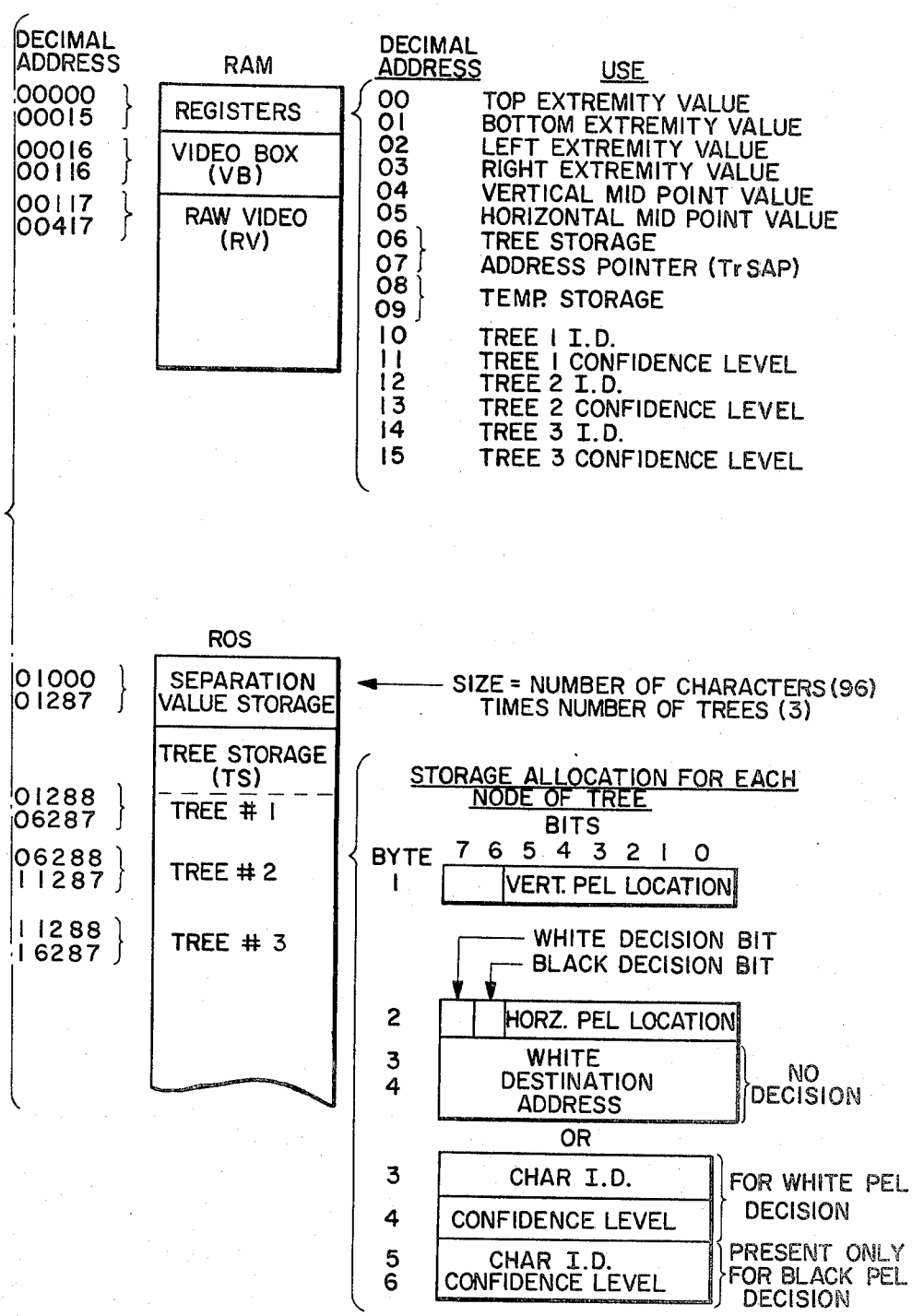

FIG. 9 describes memory allocation and address information for a probabilistic tree implementation.

FIG. 10 is a flow diagram of the probabilistic tree implementation.

Figure 11:
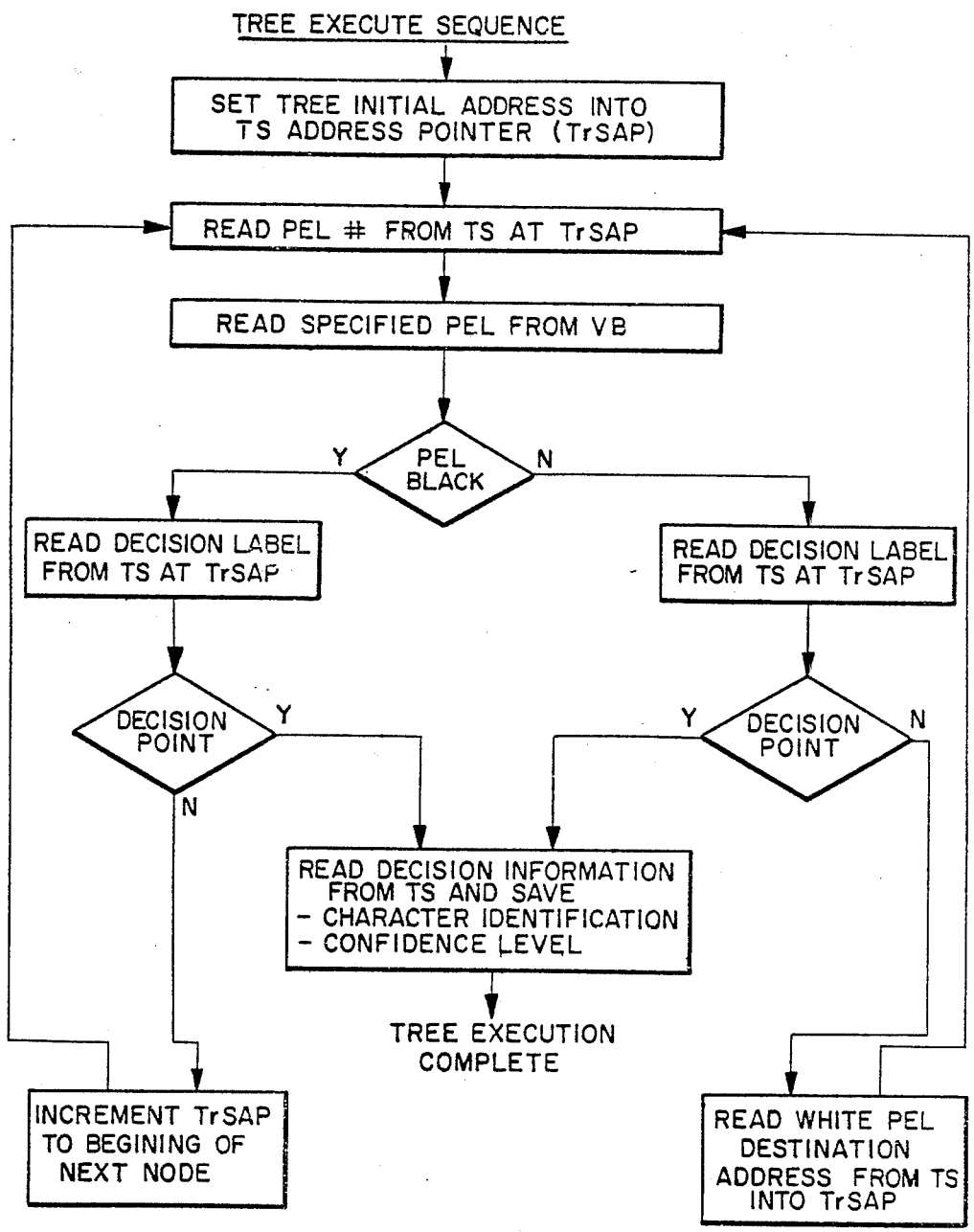

FIG. 11 is a flow diagram of the tree execute sequence employed in the probabilistic tree implementation.

BEST MODE FOR CARRYING OUT THE INVENTION

Figure 1:
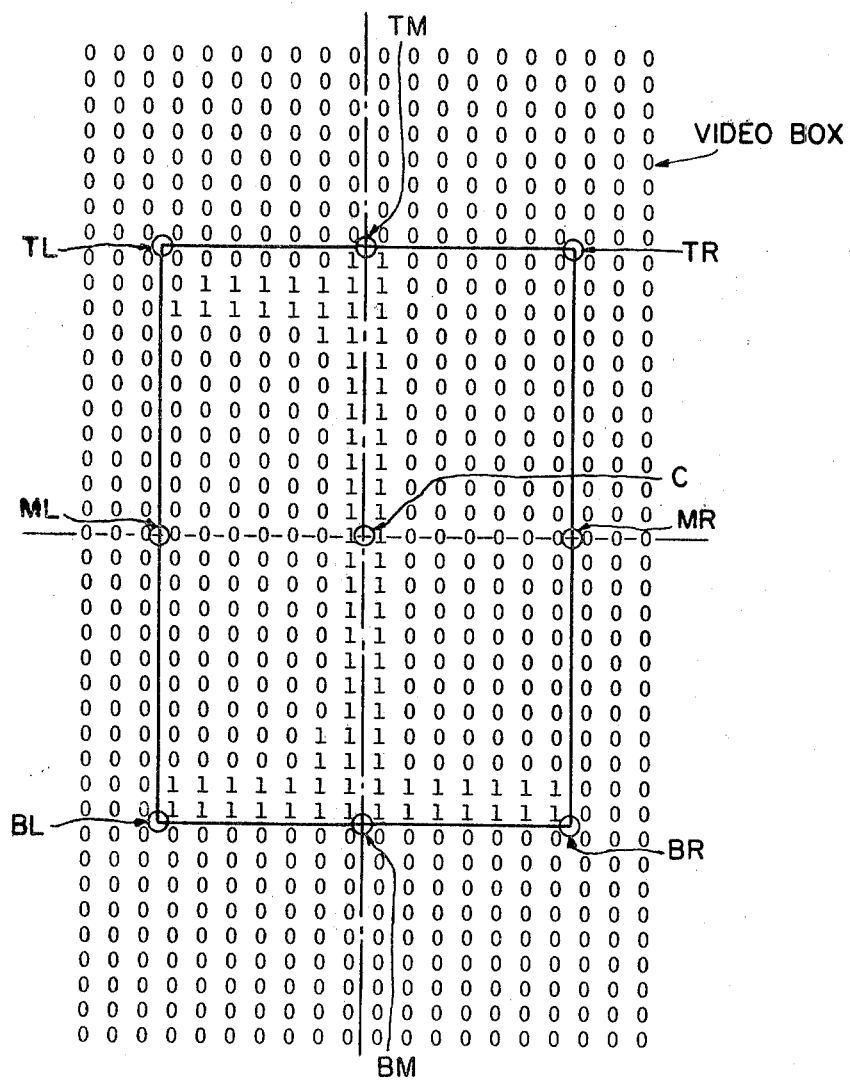
FIG. 1 illustrates the registration at multiple points of an image in binary form at each image storage location.
Figure 4:
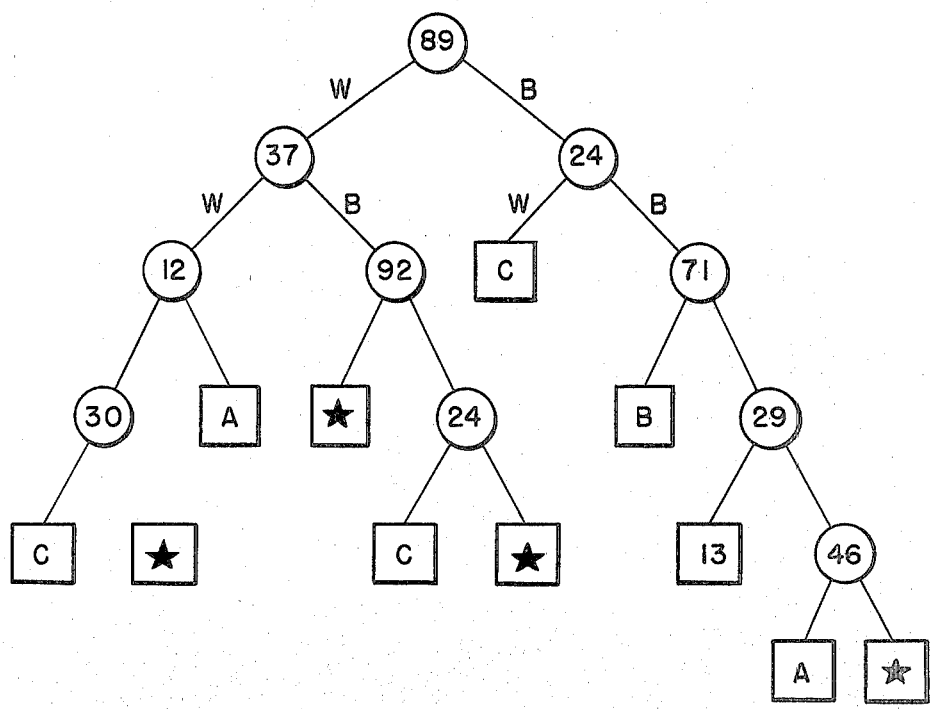
FIG. 4 illustrates a probabilistic tree recognition model design.

Registration is the method by which an unknown character is placed in a video box prior to recognition. FIG. 1 illustrates this principle. The large rectangle of 0's and 1's in FIG. 1 represents the video box. The 1's within the video box represent the character image, in this instance a lower case "1". The box drawn with a solid line represents the vertical and horizontal bounds of the character shape and is a parameter that many registration algorithms employ. Current recognition techniques register this character shape in one position before performing recognition. For example, in the work to date, some designs register the center of the character bound box, marked C in FIG. 1, at the center of the video box. Others register the bottom-left corner of the bound box, marked BL, in the bottom-left corner of the video box. Marked in FIG. 1 as follows: C, BL, ML (middle left), TL (top left), TM (top middle), TR (top right), MR (middle right), BR (bottom right), and BM (bottom middle), with two letter symbols are nine straightforward registration points. Many others are possible, such as the center of density of the character shape.

A fundamental element of this invention is the employment of the fact that differences between characters, called character separation or character confusion, vary in each of the registered positions. The basic approach is to apply a recognition algorithm to each character in the registered position where it is most separated from the rest of the characters with which it could be confused. This is different from conventional techniques that apply a recognition algorithm in only one position. Experimental results, to be shown below, reveal that there is no one registration position that optimizes character separation for all characters.

Figure 2:
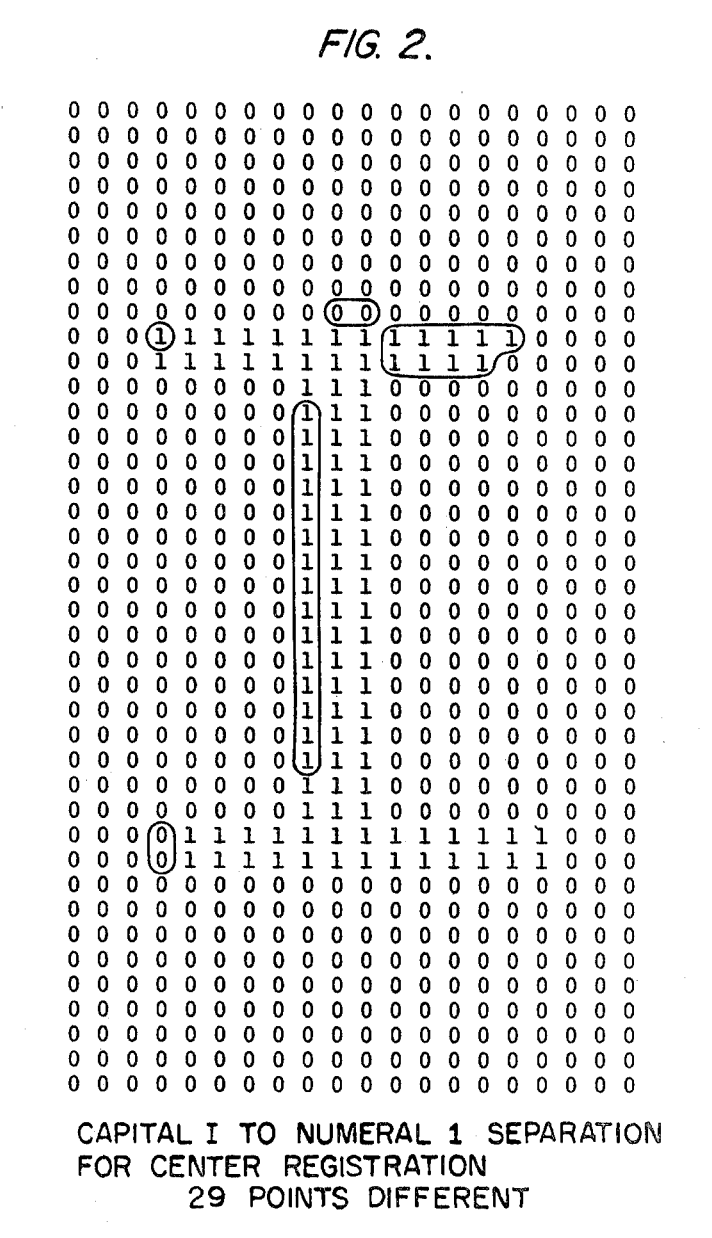
Figure 3:
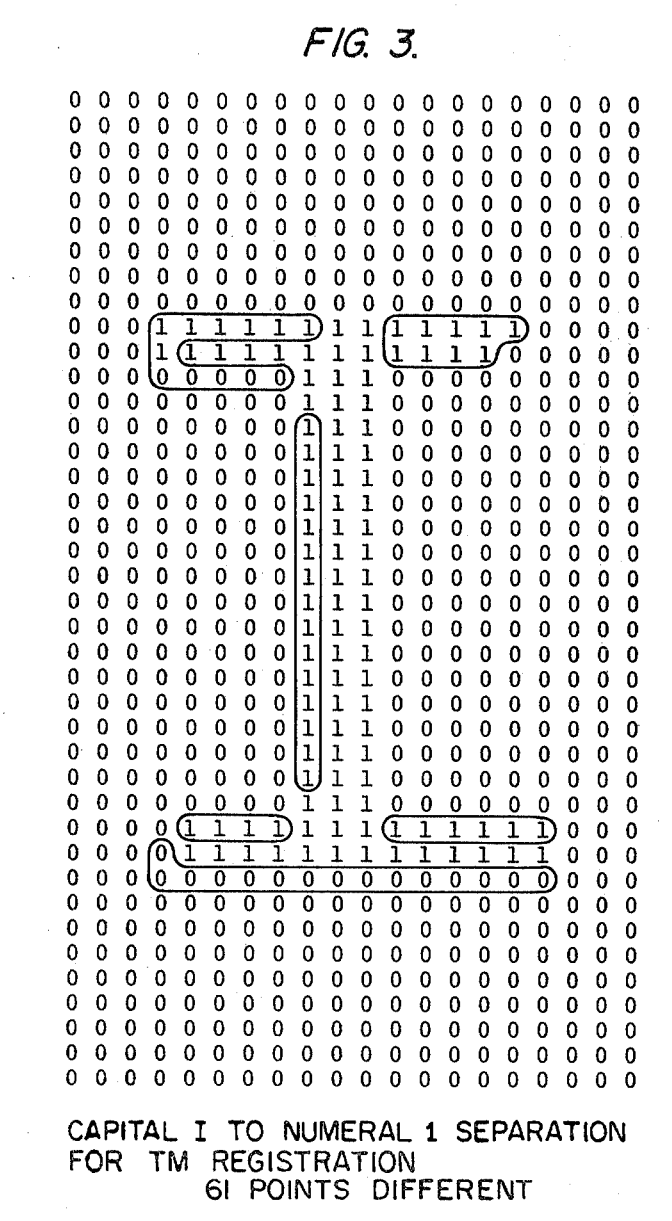

For example, FIG. 2 is the image pattern for a letter "capital I." The circled image elements are those elements that are different from the "numeric 1" pattern of FIG. 1 if the two characters were registered by aligning the centers as defined in FIG. 1. There are 29 image elements that are different. Accordingly, there are 29 units of character separation if element differences are used as a measure of separation. In FIG. 3, the results are shown for the case of aligning the top middle (TM) registration points. In this case, the character separation is 61 units, presenting a recognition algorithm with a much easier task when it attempts to separate the "I" from the "1". However, as shown later, the TM registration is not optimum for other character confusion pairs. Optimum character pair separation can only be achieved if recognition is attempted on an image pattern for a character at the registration where that particular character is most separated from the other. As stated earlier, the basic foundation of this invention is to do just that.

PRACTICAL DESIGN

As character fonts or writing styles differ, different characters will have different elements of difference. The example of FIG. 2 showed 29 elements different between the "capital I" and the "numeric 1". Should the font or writing style be different, the number of elements of difference might be greatly more or less, assuming no change in registration.

Accordingly, the final design of any system based upon elements of difference will vary with the form of the characters in the system. An extreme example is the difference between a conventional type style and writing in cursive form. The final design of a system of multiple registration to recognize the conventional type style would be expected to differ greatly in optimum registration designation for one design to recognize cursive. Where different type styles having different optimum registrations appear in the same group of characters to be recognized, the registration point is made a function of the type style being recognized, as well as the character being recognized.

The invention is applicable to systems recognizing groups of characters in any form or style. Accordingly, no specific final design of selected registration points can be said to be preferred as the specifics vary with all the details of form of the characters to be recognized.

The following describes the specific selection of one of nine possible registration points for characters of the conventional type style Prestige Elite. The design information shown in the following tables is obtained by comparing each character image in the entire group with the image of every other character in the group. Although this could be done manually, it is quite repetitive and can be accomplished much more efficiently by using conventional data processing to make the comparisons. As is generally standard technique in this field, all character images used were an average of the image of actual written characters, rather than theoretical images.

Table I results from the printout of the results from a computer program that automatically performs the character separation calculations for each of the registered positions defined in FIG. 1. Each column represents a different registered position, as labeled. The first column designates the character for which the character separations are calculated, with the character first given a number in sequence and then shown in normal form. The columns labeled CENTER through BC have two entries. The first is the character (with the number of the character following in parenthesis) that is most confounded with, or similar to, the character indicated by the first column when all characters are registered as labeled by the column heading. The second is the separation units or elements between those two characters. For example, the row for capital I and column CENTER indicate that lower case 1 is the character that is most similar to capital I of all of the characters other than I, for the CENTER registration position, and that the separation is 29 units. The separation units are a measure of the closeness of the character pair that will be the most difficult pair for a template or other recognition model to separate. In other words, large separation corresponds to greater ease or better performance for a recognition algorithm. The values for separation are underscored for those registration positions where the separation is largest.

Observations from Table I are: (1) there are distinct differences in character separations at each registration position, (2) there is no registration position that provides maximum separation for every class, (3) separation can be increased by considering each character at its best registration rather than all characters at one registration.

Table II shows the amount of separation gain that can be achieved for each class, based on the data of Table I, when the best registration for each character is used versus the BL registration, which is the best single registration point for the group of characters under consideration. Table II shows separation gain for 53 of the 93 classes. More importantly, many of the gains are very significant. From Table I, the gain for capital A is 107 to 113 units and is not that significant because of the large separation already provided by the BL registration. However, the gain for capital I is 29 units to 61 units and is significant because of the low separation provided by BL for this class. Examination of Table I or Table II indicates this type of significant gain for many characters.

In fact, recognition performance can be better estimated by analyzing the more difficult character separations than by considering all separations in some type of average. Table III shows the 20 most difficult (closest) character confusions for the BL registration and the amount of separation gain for the best registration. The separation values in Table III that are enclosed in parenthesis are situations for which some recognition systems have additional information to aid in recognition decision. For example, relative vertical position is used to separate the comma-apostrophe. Underscores and blanks (space character) in some recognition approaches are deleted prior to attempting recognition. Eliminating these special cases, Table II shows 29, 30, 34, 37 and 38 as the lowest five character separations with which the BL registration must cope, while 38, 47, 49, 50 and 56 are the lowest five separations for the best registration case. This indicates the advantages of the multi-registration approach of this invention.

RECOGNITION MODELS

The application of this invention will depend upon the type of recognition model being used. Two approaches of greatest interest today are the probabilistic pel tree and template matching. (Pel is a standard term for digitized picture element). Multi-registration seems to offer more advantages for template matching but can enhance the performance of both. A characteristic of template matching is that a template is provided for each character to be recognized. In its simplest (but not the most practical) form, an unknown character is compared to a template for each character with a recognition decision made on the basis of the character whose template is the closest match to the unknown character.

TEMPLATES—FULL AND PARTIAL

The most straightforward template is a permanent memory defining each point of the memory field as light or dark in a pattern corresponding to the image of the character to be recognized by that template. Each area of the image in memory is compared against the corresponding unit of information in the template. Such a template is a full template.

In actual practice of this invention, use of a partial template rather than a full template is preferred. Also, preference among recognition models is not a part of the basic novelty of this invention and the invention is not directly dependent upon any particular characteristic of the recognition model.

A partial template is preferred of the type described by R. G. Casey and G. Nagy in their paper "Efficient Design of Templates for Character Recognition," in *The Quarterly Bulletin of the Information Processing Society of Canada*, Fall 1968, Vol. 8, No. 6, at pages 11–17. As there described, the basic design approach of such a template is to observe only those points of a full template having a high probability of consistency. Thus, for any character where a large enough sample is made to accommodate normal variations, the resulting information reveals areas on the template which are possibly 85% or even 95%, depending primarily upon the character style, consistently black or white. This leaves a substantial area below a selected percentage which need not be considered because of the ambiguity of information from that area.

In actual practice employing a partial template, elements located within the predefined areas of ambiguity are not examined at all, thus realizing some saving in structure and increase in speed. As with the full template, a different partial template is employed for each character to be recognized, with all of the templates normally being compared to the unknown character.

When template matching is employed, multi-registration gains can be achieved by simply comparing a character template against the unknown character when the unknown character is in the registration position that is optimum for that particular template. Specifically referring to Table I, the template for capital A is compared to the unknown character when the unknown character is in the TL, TR or MR registration positions, while the template for capital D is tested with the unknown character registered at the BL, ML or TL position, capital Q at the BL or BM positions, and so on. The templates for each class are designed on sample characters that are also registered at the optimum point for that class.

PROBABILISTIC TREE

The probabilistic tree is described generally in paper by R. G. Casey published in IBM Technical Disclosure Bulletin, titled "Automatic Generation of OCR Logic From Scanned Characters," August 1979, Vol. 22, No. 3 at pages 1189–1190. Basically, it involves the examination of a character image in memory point by point with each point of examination governed by the result of the examination of the previous point. In the design, the following point is selected by the probability of significance of the information at that point in view of the information from a prior point. Each probabilistic tree typically identifies all the characters in a set to be identified. Multiple different probabilistic trees examining the same unknown character are typically employed. A difference in such trees is that the initial point examined may be different, which, of course, results in differences throughout the overall design.

Figure 5:
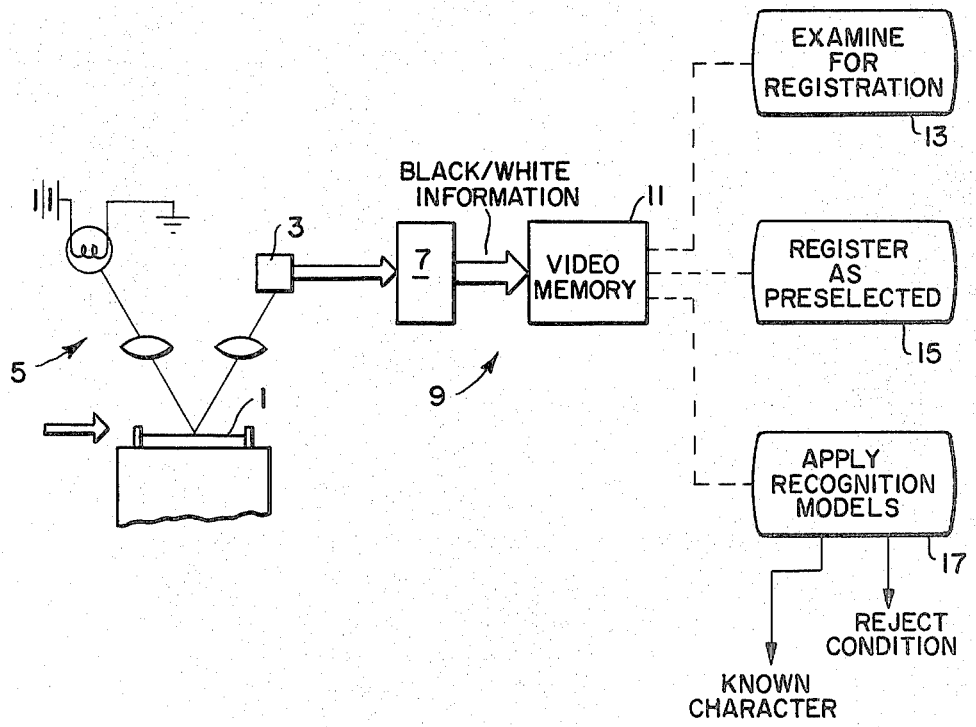
FIG. 5 illustrates an operating system.

FIG. 5 is merely illustrative of a typical probabilistic tree design. The image of the character to be recognized is considered to be digitized with the discrete area identified by location numbers. In FIG. 5 W and B (white or black) indicate picture conditions at the higher location indicated by circles. Squares indicate final, terminating conditions, either with the recognition of the symbol in the square or with a reject, indicated by a star in a square.

The first examination is at location 89. If the picture element there is white, the next examination is at location 37; while if the picture element is black, the next examination is at location 24. Assuming the next examination is made at location 37, if that picture element is white, the next examination is made at location 12; while if the picture element is black, the next examination is at location 92. Assuming the next examination is made at location 92, if that picture element is white, a reject or character not recognized condition is set and the examination is terminated; while if the picture element is black, the next examination is at location 24. Assuming the element at location 92 was black, an examination is then made at location 24. If that picture element is white, a designation of the character recognized, C in this illustration, is signaled and the examination is terminated. If that picture element is black, a reject or character not recognized condition is set and the examination is also terminated.

The probabilistic tree generally provides greatly reduced processing requirements at the cost of reduced accuracy. Because of those advantages of speed and economy, it is expected that a commercial implementation will employ the probabilistic tree as the recognition model. To achieve desired levels of consistent recognition, it is expected that such a commercial implementation would employ comparison against at least three different probabilistic trees. Such a multiple test approach is known where the registration of the character image remains the same. This invention would be applicable to an implementation employing multiple probabilistic tree tests and multiple registration perspectives.

MULTIPLE PROBABILISTIC TREE TESTS AT MULTIPLE REGISTRATION

In the multiple tree situation, the advantages of multiple registration can be achieved by designing and testing each tree at a different registration, rather than at one single registration. For example, if x trees are to be used, the best x of the 9 registrations in FIG. 1 would be used. For three trees, the data of Table I indicates that the positions of BI, TR, and ML are three good candidates because they provide the best separation for a greater number of character pairs. Very little extra cost is included for testing the trees at different registrations since the techniques typically test an unknown character at several re-registration positions close to the nominal, single registration for which they were designed.

In this multi-tree, multi-registration case, the results of the multiple trees will be averaged together with different weighting of each tree decision in proportion to the separation value of the character detected for the specific registration at which the tree was tested. The data of Table I will be used as an example for a two-tree case. If tree #1 at registration TL decided that the character was capital A and tree #2 at registration BL decided that the character was capital D, the decision of tree #1 would be weighted greater than tree #2 (in this specific case) because the separation of capital A at TL registration is greater than capital D at BL. The use of multiple trees at multiple registration and the use of separation values as weighting functions are improvements based on the multiple registration technique. Multi-tree, multi-registration can also be used with many of the other approaches for combining multiple decisions that have been developed in recognition and mathematics known prior art.

AN OPERATING SYSTEM

Reference is made to FIG. 5 which is illustrative only and differs from a prior art system only in the multiple registration manipulations of this invention. Any data processing system capable of the high-speed logical steps and other functions needed for character recognition is entirely suitable for use with this invention. None is especially preferred. To date this invention has been most satisfactorily tested using partial templates and a large, conventional general purpose data processing system along with suitable optics and essentially conventional electrical interface systems and connections to that system. It is anticipated, however, that a commercial implementation would employ a suitable, general purpose microprocessor as the data processing system, as microprocessors now can be found having sufficient data processing capabilities at low cost.

Referring to FIG. 5, a document 1, which may be a type-written page, is moved relatively past a photoconductor scanning array 3, while illuminated by an optical system 5. Through an appropriate interface 7, by which clock-pulse timing and other routine implementation details are imposed, the results of the scan are entered as electrical signals into the data processing system 9.

The image of the character to be recognized in such a digital system is converted to a binary pattern of one signal for light and an opposite signal for dark. The character is effectively divided into a grid pattern, with each subdivision being defined as light or dark by signals from the photoconductor array 3, basically as illustrated in FIG. 1, which shows such a grid with a 1 or 0 in each subdivision to illustrate the theoretical discussion.

In the processing system, the black and white information of each location is stored at individual memory locations in video memory 11. The system has means 13 to examine the unknown character for determining registration points; means 15 to register the unknown character in accordance with different, preselected registration perspectives and means 17 to apply a recognition model to the 50 registered unknown characters. Finally, the system signals either the identity of the character or the rejection of the character as not identified.

In the data processing system 9, individual images of characters, as dark elements surrounded by white, are isolated in memory. Registration is conducted by examining the isolated character in accordance with the registration to be conducted. For a center registration, the area of memory containing the character is examined from the side, with the start of image and the end of image observed and stored. The middle of this point is computed and stored. Similarly, the character is examined from the top or bottom, with the top of image and the end of image noted, and the middle of that part computed. The intersection of those two middle points is the center.

The registered image is compared at high speeds made possible by electronic data processing with a template or other recognition model. To accomplish this comparison, the stored image may be physically moved in memory to a point which conforms with its registration. In certain data processing systems, this may facilitate subsequent comparison point-by-point from the desired registration with a template or other recognition model. Such a movement in memory has been used in the most satisfactory implementation of this invention to date. Where the movement can be, effectively, simulated efficiently by data processing techniques such as the indexing of addresses, use of such techniques would generally be preferable.

Where the recognition model is a template, rarely does comparison with the first recognition model produce recognition, since one template represents only one character. In the preferred system all of the templates of characters to be recognized are examined regardless of the apparent previous recognition of a character against one template. This is because the character is to be rejected if two templates are satisfied, which is a state of the art technique improving overall reliability.

In prior art systems, the registration of the image remains the same or is varied only slightly around the point of registration. When the image is that of the template, this will be recognized in data processing by the observation of predetermined condition of elements in storage matching those indicated by the model. Of course, imperfections in the images are expected, so a predetermined level of matching is required. When such a level is reached, the apparent recognition on the character is stored, and, after comparison of the other templates against the character, the entire sequence is initiated for the next character.

IMPLEMENTATION—PARTIAL TEMPLATE

FIGS. 6, 7 and 8 illustrate implementation using a partial template as the recognition model. FIG. 6 describes memory allocation and corresponding address information, description by decimal address is for convenience of the reader as the machine operates conventionally on eight bit bytes in binary code.

As detailed in FIG. 6, the system has a random access memory (RAM) in which the raw video information is stored at 00114 through 00414. It has a video box at 00013 through 00113 for positioning of the video information in a selected position of registration. Addresses 00000 through 00012 of the RAM store the registration points, template address information, count and decision information.

The system has a read only memory or store (ROS) to store the partial templates and related information. One location, 00999, stores the number of templates, so as to have that information for termination. The template start address table (TSAT) is at locations 01000 through 01191 and the templates are stored beginning at 01192.

The storage allocation for each template starts with byte 0, which gives the preselected registration perspective, in response to which the unknown character will be so registered. The next two bytes provide the end of template address. The next bytes are designated picture elements (PEL) test modules, which, as shown at the bottom right, define one location in the video box and whether a black or a white bit is to be considered significant (a hit) and therefore counted. The last two bytes store a count defining a threshold, at which a character is considered identified, and, lastly, the identity of the character identified by the template.

Functioning is illustrated by the flow diagrams of FIGS. 7 and 8.

At the start, the system is initiated with the template execution counter (TEC) being set to one and the decision store (DS) cleared. The system then proceeds to the template execute sequence on the first template.

The template execute sequence is shown in FIG. 8. The template start address is read from the ROS at the beginning location, 01000, subsequently, this is indexed by two for each template examined, as represented by the total in TEC.

Next, the top, bottom, left, and right point of transition between black and white of the unknown character in RV are determined and stored in the RAM. The vertical and horizontal midpoints are then determined and stored in the RAM.

The preselected registration of TS is read from the first location of the template under consideration. The template address pointer (TAP) is indexed one. The unknown character is then moved from RV to VB at the registration specified.

Character recognition then proceeds in a conventional manner for a template system, as shown in the flow diagrams.

Picture elements corresponding to that of the template are considered hits and the hit counter is incremented. After examination of all elements specified by the partial template, recognized by TAP being greater than the size of template, as stored at end template store (ETS), the count is compared with the threshold stored (FIG. 7).

Where the count is not greater than the threshold, TEC is directly incremented and a comparison is made to determine that another template remains to be applied. If so, the system returns to the template execute sequence, in which the next template will be accessed from the ROS.

Where the count is greater than the threshold and DS is zero the identity of the character is read from the template store and stored in DS. TEC is then incremented and a comparison is made to determine that another template remains to be applied. If so, the system returns to the template execute sequence, in which the next template will be accessed from ROS.

The identification is terminated when HC is greater than threshold and DS is not zero. This indicates identification by more than one templates, which is an error condition. A reject character decision is signaled. Similarly, a reject character decision is signaled when TEC is greater than the number of templates and DS is zero. A valid character identification is signaled only when TEC is greater than the number of templates and DS does not equal zero. This condition is reached when one and only one template produces hits above the threshold for that template.

IMPLEMENTATION—PROBABILISTIC TREE

FIGS. 9, 10 and 11 illustrate implementation using the probabilistic tree as the recognition model. FIG. 9 describes memory allocation and corresponding address information. Description by decimal address is for convenience of the reader as the machine operates conventionally on eight bit bytes in binary code.

As detailed in FIG. 9, the system has a random access memory (RAM) in which the raw video information is stored at 00117 through 00417. It has a video box at 00016 through 00116 for positioning of the video information in a selected position of registration. Addresses 00000 through 00015 of the RAM store the registration points, the tree storage address pointer (TrSAP), two temporary locations for temporary information, and two locations for each tree to store the character identified and the confidence level for the identified character.

The storage allocation for each node of a tree starts with byte 1, which gives the vertical PEL location, byte 2 gives the horizontal PEL location and defines either white or black as the decision bit. The next two bytes define the destination of the next node if the bit is white and there is no decision. (If the bit is black and there is no decision, the address need only be incremented.) The next two bytes contain the character identification and a designation of confidence level for a white decision, while the next two contain the same information for a black decision.

The system has a read only memory or store (ROS) to store three probabilistic trees.

Tree #1 is stored at 01288 through 06287, tree #2 is stored at 06288 through 11287, and tree #3 is stored at 11288 through 16287. In addition addresses of 01000 through 01287 store separation values.

It should be understood that this probabilistic tree implementation differs from the state of the art only in the multiple registration and the associated separation values. With ninty-six characters to be recognized and three trees, two hundred eighty-eight individual separative values are stored, each being the value for one character from one tree. This value, in turn, is a measure of the points of separation of the character from the closest character at the registration at which the image is applied against the tree. These points of separation are discussed theoretically above, particularly in connection with Table I. Here, where probabilistic trees are used, greater points of separation will be used as a measure of greater confidence in an identification by a tree.

Referring to FIG. 10, execution begins by calculation of the boundaries of a character to be identified in raw video, followed by location of the registration points.

The character is then moved into the video box with bottom left at the lower left point, the predetermined registration for tree #1. Execution of the tree sequence begins as illustrated in FIG. 11.

Information for the first PEL is read from tree storage (TS). The specified PEL is read from VB. When the PEL is black, the decision label is read from TS. If black is not a decision, TrSAP is incremented to the next node. When the PEL is white, the decision label is read from TS. If white is not a decision, the new destination address is read from TS.

When a decision is made, the character identification and associated confidence level is read from TS and stored and the sequence for the tree is complete.

As shown in FIG. 10, the character is then moved into the video box in top right registration, the preselected registration for the next tree. Execution, with storage of the results, is as described for the first tree, with the node information being that for the tree. The identification and confidence level are saved.

The system then proceeds similarly to the third tree, for which the character is registered at center left. This results in the storage of three identified characters (or reject indications) with associated confidence levels.

The separation value for each identified character is then read from ROS. Each confidence level is modified in accordance with that separation value. With the greater weight on significance afforded to that character identified which has more points of separation at the registration at which it was identified. An overall calculation is made of the confidence in the tree results. Confidence is either determined as adequate or not, and the results signaled accordingly.

CONCLUSION

It has been made apparent that this invention is general in basic concept and capable of implementation by a wide variety of techniques and that, accordingly, coverage should not be limited to the specific forms disclosed but should extend to the true inventive scope and contribution of this invention as herein disclosed, with particular reference to the accompanying claims.

TABLE I

CHARACTER SEPARATION AT EACH REGISTRATION

| No. | Char. | CENTER | BL | ML | TL | TM | TR | MR | BR | BM |
|---|---|---|---|---|---|---|---|---|---|---|
| 1 | A | . (90) 97 | n (58) 107 | / (41) 105 | . (86) 105 | ; (43) 105 | . (86) 113 | . (86) 113 | . (37) 110 | a (45) 90 |
| 2 | B | E (5) 76 | E (5) 76 | E (5) 76 | (86) 76 | F (6) 76 | F (6) 84 | E (5) 76 | E (5) 76 | E (5) 76 |
| 3 | C | G (7) 48 | G (7) 48 | G (7) 48 | G (7) 48 | G (7) 48 | O (15) 82 | O (15) 82 | O (15) 82 | G (7) 48 |
| 4 | D | O (15) 75 | U (21) 80 | U (21) 80 | U (21) 80 | O (15) 75 | O (15) 75 | O (15) 75 | O (15) 75 | B (2) 75 |
| 5 | E | F (6) 70 | B (2) 76 | B (2) 76 | U (21) 92 | F (6) 70 | F (6) 38 | F (6) 38 | B (2) 76 | B (2) 76 |
| 6 | F | P (16) 38 | P (16) 38 | P (16) 38 | P (16) 38 | P (16) 38 | P (16) 38 | P (16) 38 | P (16) 38 | P (16) 38 |
| 7 | G | C (3) 48 | C (3) 48 | C (3) 48 | C (3) 48 | C (3) 48 | O (15) 80 | O (15) 80 | O (15) 80 | C (3) 48 |
| 8 | H | U (21) 82 | U (21) 82 | U (21) 82 | U (21) 82 | U (21) 82 | U (21) 82 | U (21) 82 | U (21) 82 | U (21) 82 |
| 9 | I | 1 (56) 29 | 1 (56) 29 | 1 (56) 29 | 1 (56) 29 | 1 (56) 29 | 1 (56) 61 | 1 (56) 29 | 1 (56) 29 | 1 (56) 29 |
| 10 | J | 3 (30) 69 | d (48) 82 | d (48) 82 | — (93) 72 | j (54) 79 | [ (89) 58 | k (89) 72 | [ (89) 72 | j (54) 39 |
| 11 | K | R (18) 94 | R (18) 94 | E (5) 51 | R (18) 62 | R (18) 51 | 141 | k (55) 133 | k (55) 133 | R (18) 94 |
| 12 | L | F (6) 88 | F (6) 88 | 1 (28) 51 | I (9) 62 | P (16) 114 | 88 | F (6) 88 | (93) 79 | t (64) 69 |
| 13 | M | N (14) 130 | N (14) 116 | n (14) 114 | X (24) 111 | H (8) 112 | H (8) 133 | H (8) 133 | m (57) 137 | n (14) 134 |
| 14 | N | h (52) 109 | h (52) 109 | h (52) 109 | X (24) 111 | X (24) 111 | X (24) 111 | h (52) 109 | h (52) 109 | h (52) 109 |
| 15 | O | 0 (27) 49 | G (7) 58 | 0 (27) 49 | Q (17) 32 | Q (17) 32 | Q (17) 32 | 0 (27) 49 | 0 (27) 69 | G (7) 58 |
| 16 | P | F (6) 38 | F (6) 38 | F (6) 38 | F (6) 38 | F (6) 38 | F (6) 38 | F (6) 38 | F (6) 38 | F (6) 38 |
| 17 | Q | o (59) 102 | F (6) 130 | o (59) 102 | O (15) 32 | O (15) 32 | O (15) 32 | o (59) 102 | ) (80) 129 | (86) 130 |
| 18 | R | H (8) 93 | H (8) 93 | B (2) 93 | B (2) 93 | H (8) 93 | H (8) 93 | H (8) 93 | H (8) 93 | H (8) 93 |
| 19 | S | 8 (35) 66 | J (10) 85 | 8 (35) 66 | J (10) 85 | 8 (35) 85 | 8 (35) 86 | 8 (35) 66 | C (3) 87 | 3 (30) 90 |
| 20 | T | 1 (28) 41 | 1 (56) 77 | 1 (56) 73 | — (93) 64 | I (9) 64 | I (9) 64 | I (9) 56 | I (9) 56 | 1 (28) 41 |
| 21 | U | D (4) 80 | D (4) 80 | D (4) 80 | D (4) 80 | D (4) 80 | H (8) 82 | H (8) 82 | H (8) 82 | D (4) 80 |
| 22 | V | v (66) 77 | v (66) 87 | v (66) 77 | u (65) 84 | " (85) 76 | u (65) 84 | v (66) 77 | v (66) 84 | . (37) 86 |
| 23 | W | w (67) 85 | w (67) 105 | w (67) 85 | w (67) 85 | w (67) 125 | w (67) 125 | w (67) 85 | w (67) 105 | w (67) 105 |
| 24 | X | Z (26) 85 | y (69) 93 | y (69) 93 | y (69) 93 | Z (26) 93 | y (69) 97 | y (69) 97 | y (69) 97 | y (69) 97 |
| 25 | Y | y (69) 68 | y (69) 68 | y (69) 68 | y (69) 66 | y (69) 66 | y (69) 66 | y (69) 68 | y (69) 68 | y (69) 68 |
| 26 | Z | X (24) 85 | 2 (29) 93 | ? (42) 78 | ? (42) 78 | ? (66) 78 | v (66) 84 | ? (42) 67 | 2 (29) 96 | 2 (29) 93 |
| 27 | 0 | O (15) 49 | O (15) 69 | O (15) 49 | O (15) 61 | O (15) 61 | O (15) 61 | O (15) 49 | O (15) 69 | O (15) 69 |
| 28 | 1 | 1 (56) 14 | ] (88) 39 | L (12) 51 | ] (88) 47 | 1 (56) 51 | 1 (56) 14 | 1 (56) 56 | 1 (56) 56 | 1 (56) 14 |
| 29 | 2 | ? (42) 85 | (93) 77 | 3 (30) 86 | 3 (30) 86 | 3 (30) 86 | 3 (30) 86 | ? (42) 79 | (93) 77 | (93) 77 |
| 30 | 3 | J (10) 69 | 2 (29) 100 | 2 (29) 86 | 2 (29) 86 | ? (42) 86 | 5 (32) 86 | 5 (32) 72 | — (71) 82 | J (10) 69 |
| 31 | 4 | (86) 97 | (86) 86 | (86) 100 | (86) 100 | (37) 99 | (86) 100 | (65) 93 | (84) 91 | (85) 93 |
| 32 | 5 | 3 (30) 72 | 3 (30) 96 | 3 (30) 96 | (93) 91 | " (85) 79 | 3 (30) 79 | 3 (30) 72 | o (59) 79 | 3 (30) 84 |
| 33 | 6 | b (46) 87 | b (46) 101 | b (46) 101 | ( (79) 89 | w (67) 87 | w (67) 87 | b (46) 93 | b (46) 83 | b (46) 77 |
| 34 | 7 | ? (42) 67 | ? (42) 79 | ? (42) 79 | (93) 59 | Z (26) 59 | / (41) 53 | ? (42) 67 | (86) 79 | (86) 79 |
| 35 | 8 | S (19) 66 | S (19) 98 | S (19) 86 | S (19) 86 | S (19) 86 | S (19) 86 | S (19) 66 | S (19) 98 | S (19) 98 |
| 36 | 9 | q (61) 97 | q (61) 122 | c (47) 108 | c (47) 88 | q (61) 88 | p (60) 98 | ) (80) 104 | ) (80) 88 | V (22) 114 |
| 37 | . | , (38) 28 | : (44) 31 | (38) 28 | , (38) 18 | (38) 18 | (38) 18 | (38) 28 | (38) 31 | (38) 31 |
| 38 | , | (84) 22 | (84) 28 | (84) 22 | (37) 18 | (38) 18 | (37) 18 | (84) 22 | (84) 28 | (84) 28 |
| 39 | — | (93) 14 | (93) 14 | (93) 14 | (93) 24 | (93) 24 | (93) 24 | (93) 14 | (93) 14 | (93) 40 |
| 40 | = | (90) 71 | (90) 40 | (90) 53 | (90) 53 | (90) 53 | (90) 14 | (90) 43 | (93) 43 | (93) 43 |
| 41 | / | (37) 71 | (86) 72 | (86) 72 | (86) 72 | 7 (34) 53 | 7 (34) 53 | 7 (34) 72 | (86) 72 | (86) 72 |
| 42 | ? | 7 (34) 67 | (86) 60 | (86) 70 | (90) 60 | . (90) 60 | , (38) 55 | 7 (34) 67 | (86) 60 | (86) 60 |

TABLE I-continued

CHARACTER SEPARATION AT EACH REGISTRATION

| No. | Char. | CENTER | BL | ML | TL | TM | TR | MR | BR | BM |
|---|---|---|---|---|---|---|---|---|---|---|
| 43 | ; | (86) | , (38) | (86) | (86) | (86) | (86) | (86) | , (38) | , (38) |
| | | 56 | 30 | 56 | 38 | 38 | 38 | 56 | 30 | 30 |
| 44 | : | (86) | ' (84) | (86) | (86) | (86) | (86) | (86) | ' (84) | ' (84) |
| | | 49 | 34 | 49 | 34 | 34 | 34 | 49 | 34 | 34 |
| 45 | a | s (63) | s (63) | s (63) | s (63) | s (63) | n (58) | n (58) | n (58) | s (63) |
| | | 61 | 63 | 63 | 63 | 63 | 73 | 73 | 73 | 61 |
| 46 | b | h (52) | h (52) | h (52) | h (52) | h (52) | D (4) | D (4) | b (33) | h (52) |
| | | 54 | 58 | 58 | 58 | 58 | 92 | 84 | 83 | 54 |
| 47 | c | e (49) | o (59) | o (59) | o (59) | e (49) | e (49) | e (49) | e (49) | e (49) |
| | | 36 | 47 | 47 | 47 | 36 | 36 | 36 | 36 | 36 |
| 48 | d | J (10) | a (45) | J (10) | J (10) | J (10) | 1 (71) | 1 (71) | a (45) | u (65) |
| | | 82 | 79 | 90 | 90 | 90 | 88 | 84 | 79 | 69 |
| 49 | e | c (47) | c (47) | c (47) | c (47) | c (47) | c (47) | c (47) | c (47) | c (47) |
| | | 36 | 50 | 50 | 50 | 36 | 36 | 36 | 36 | 36 |
| 50 | f | [ (89) | 1 (28) | 1 (28) | 1 (28) | [ (89) | ° (90) | Y (25) | t (64) | r (62) |
| | | 83 | 53 | 53 | 69 | 67 | 79 | 104 | 69 | 64 |
| 51 | g | Z (26) | S (19) | 8 (35) | S (19) | z (70) | Z (26) | Z (26) | Z (26) | S (19) |
| | | 104 | 109 | 89 | 104 | 103 | 104 | 87 | 116 | 111 |
| 52 | h | b (46) | b (46) | b (46) | b (46) | b (46) | k (55) | k (55) | n (58) | b (46) |
| | | 54 | 58 | 58 | 58 | 54 | 54 | 80 | 65 | 54 |
| 53 | i | 1 (56) | 1 (56) | 1 (56) | 1 (56) | 1 (56) | ÷ (87) | 1 (56) | 1 (56) | 1 (28) |
| | | 37 | 37 | 37 | 37 | 57 | 69 | 37 | 37 | 37 |
| 54 | j | (86) | (86) | (86) | (86) | (86) | ; (43) | (86) | , (38) | , (38) |
| | | 81 | 81 | 81 | 73 | 73 | 69 | 81 | 76 | 39 |
| 55 | k | h (52) | h (52) | h (52) | h (52) | h (52) | h (52) | h (52) | h (52) | h (52) |
| | | 80 | 80 | 80 | 80 | 80 | 80 | 80 | 80 | 80 |
| 56 | 1 | 1 (28) | I (9) | I (9) | I (9) | 1 (28) | 1 (28) | I (9) | I (9) | 1 (28) |
| | | 14 | 29 | 29 | 29 | 56 | 56 | 29 | 29 | 14 |
| 57 | m | O (15) | t (64) | u (65) | - (39) | 103 | r (62) | r (62) | t (64) | (93) |
| | | 111 | 107 | 110 | 101 | | 112 | 112 | 111 | 109 |
| 58 | n | u (65) | u (65) | u (65) | u (65) | 63 | a (45) | u (65) | u (65) | u (65) |
| | | 49 | 51 | 49 | 49 | | 73 | 49 | 51 | 51 |
| 59 | o | e (49) | c (47) | c (47) | c (47) | 53 | e (49) | e (49) | e (49) | e (49) |
| | | 53 | 47 | 47 | 47 | | 53 | 53 | 53 | 53 |
| 60 | p | P (16) | H (8) | ! (71) | o (59) | 77 | o (59) | P (16) | P (16) | P (16) |
| | | 74 | 94 | 98 | 77 | | 77 | 74 | 74 | 74 |
| 61 | q | 9 (36) | d (48) | d (48) | o (59) | 67 | c (47) | 1 (71) | ! (71) | d (48) |
| | | 97 | 98 | 91 | 93 | | 75 | 90 | 91 | 98 |
| 62 | r | t (64) | f (50) | t (64) | - (39) | 73 | - (39) | t (64) | t (64) | t (64) |
| | | 73 | 66 | 63 | 63 | | 73 | 59 | 41 | 55 |
| 63 | s | a (45) | a (45) | a (45) | a (45) | 63 | a (45) | z (70) | c (47) | a (45) |
| | | 61 | 63 | 63 | 73 | | 61 | 69 | 77 | 61 |
| 64 | t | r (62) | b (46) | (84) | (84) | 73 | + (81) | r (62) | r (62) | r (62) |
| | | 73 | 65 | 63 | 73 | | 88 | 59 | 41 | 55 |
| 65 | u | n (58) | n (58) | n (58) | n (58) | 73 | n (58) | r (62) | n (58) | n (58) |
| | | 49 | 51 | 49 | 73 | | 73 | 49 | 51 | 51 |
| 66 | v | ° (90) | (86) | v (22) | y (69) | 54 | y (69) | V (22) | (86) | . (37) |
| | | 76 | 86 | 77 | 85 | | 48 | 77 | 86 | 73 |
| 67 | w | W (23) | W (23) | W (23) | y (69) | 105 | y (69) | W (23) | W (23) | (85) |
| | | 85 | 105 | 85 | 85 | | 107 | 85 | 105 | 99 |
| 68 | x | z (70) | (93) | u (65) | u (65) | 81 | (93) | (93) | z (70) | z (70) |
| | | 62 | 82 | 91 | 92 | | 83 | 91 | 83 | 62 |
| 69 | y | Y (25) | Y (25) | Y (25) | - (93) | 82 | v (66) | Y (25) | Y (25) | Y (25) |
| | | 68 | 78 | 82 | 81 | | 48 | 68 | 68 | 68 |
| 70 | z | x (68) | c (47) | s (63) | s (63) | 69 | s (63) | s (63) | (93) | x (68) |
| | | 62 | 62 | 69 | 77 | | 69 | 69 | 79 | 62 |
| 71 | - | 1 (28) | : (44) | , (84) | (84) | 39 | s (84) | , (84) | : (44) | : (44) |
| | | 42 | 48 | 78 | 55 | | 66 | 59 | 48 | 48 |
| 72 | @ | 0 (27) | (86) | (84) | 0 (27) | 115 | 0 (27) | (84) | (86) | (86) |
| | | 119 | 120 | 111 | 115 | | 120 | 100 | 117 | 120 |
| 73 | # | " (85) | ! (71) | ( (79) | (86) | 119 | (86) | (90) | (86) | (86) |
| | | 116 | 108 | 110 | 119 | | 117 | 114 | 107 | 119 |
| 74 | $ | 5 (32) | (86) | (84) | (31) | 108 | (31) | (84) | (44) | (86) |
| | | 96 | 109 | 102 | 108 | | 108 | 96 | 109 | 109 |
| 75 | % | Z (26) | Z (26) | 3 (30) | 3 (30) | 109 | 3 (30) | 5 (32) | Z (26) | Z (26) |
| | | 97 | 107 | 114 | 112 | | 113 | 97 | 105 | 105 |
| 76 | ¢ | c (47) | (86) | 2 (29) | 7 (34) | 89 | ? (42) | Z (26) | ? (42) | (86) |
| | | 70 | 78 | 70 | 84 | | 83 | 89 | 87 | 86 |
| 77 | & | N (14) | (39) | c (47) | (86) | 114 | (86) | (86) | (84) | (85) |
| | | 116 | 106 | 116 | 110 | | 110 | 116 | 99 | 97 |
| 78 | * | . (37) | (39) | . (39) | (43) | 92 | . (90) | - (39) | ? (42) | z (70) |
| | | 77 | 65 | 84 | 81 | | 81 | 82 | 65 | 65 |
| 79 | ( | ; (43) | ! (71) | ! (71) | ! (71) | 81 | (86) | i (53) | (86) | Y (25) |
| | | 81 | 70 | 70 | 81 | | 81 | 80 | 81 | 81 |
| 80 | ) | (86) | (86) | (86) | (56) | 81 | (71) | (71) | ! (71) | x (68) |
| | | 85 | 83 | 77 | 84 | | 79 | 71 | 68 | 83 |
| 81 | + | ÷ (87) | ÷ (87) | - (39) | j (54) | 86 | t (64) | (93) | ÷ (87) | : (44) |
| | | 55 | 70 | 55 | 77 | | 83 | 55 | 82 | 38 |
| 82 | ÷ | ± (83) | ± (83) | ± (83) | ± (83) | 104 | ± (83) | ± (83) | ± (83) | ± (83) |
| | | 106 | 106 | 106 | 104 | | 104 | 114 | 114 | 106 |
| 83 | ± | ± (82) | ± (82) | ± (82) | ± (82) | 104 | (86) | (86) | (37) | (82) |
| | | 106 | 106 | 106 | 104 | | 112 | 112 | 103 | 106 |

TABLE I-continued

| | CHARACTER SEPARATION AT EACH REGISTRATION | | | | | | | | | | | | | | | |
|---|---|---|---|---|---|---|---|---|---|---|---|---|---|---|---|---|
| No. | Char. | CENTER | | BL | | ML | | TL | | TM | | TR | | MR | | BR | | BM | |
| 84 | , | 22 | , (38) | 28 | , (38) | 22 | , (38) | 18 | , (38) | 18 | , (38) | 18 | , (38) | 22 | , (38) | 28 | , (38) | 28 | , (38) |
| 85 | ° | 67 | ° (90) | 67 | ° (90) | 67 | ° (90) | 65 | ° (90) | 59 | v (66) | 67 | ° (90) | 67 | ° (90) | 67 | ° (90) | 67 | ° (90) |
| 86 | . | 31 | . (37) | 31 | . (37) | 31 | . (37) | 31 | . (37) | 31 | . (37) | 31 | . (37) | 31 | . (37) | 31 | . (37) | 31 | . (37) |
| 87 | ÷ | 74 | ! (71) | 61 | . (86) | 93 | i (53) | 73 | i (53) | 57 | i (53) | 57 | i (53) | 79 | i (53) | 61 | . (86) | 38 | + (81) |
| 88 | ] | | (86) | 39 | 1 (28) | 55 | 1 (28) | 47 | | | 76 | . (37) | 76 | . (37) | | (86) | 74 | . (37) | 74 | . (37) |
| 89 | [ | 72 | . (86) | 72 | . (86) | 72 | . (86) | 67 | . (37) | 67 | . (37) | 58 | J (10) | 72 | J (10) | 72 | J (10) | 72 | . (37) |
| 90 | ° | 56 | . (86) | 56 | . (86) | 56 | . (86) | 55 | . (37) | 44 | ? (42) | 43 | , (38) | 43 | , (38) | 43 | , (38) | 51 | : (44) |
| 91 | ± | 122 | ° (90) | 130 | ° (90) | 126 | ° (90) | 113 | | | 130 | t (64) | 126 | ° (90) | 129 | 5 (32) | 130 | & (77) | 125 | ; (43) |
| 92 | § | 114 | 1 (28) | 124 | 1 (56) | 120 | 1 (56) | 120 | 1 (28) | 114 | 1 (28) | 127 | " (85) | 134 | 1 (28) | 132 | [ (89) | 120 | 1 (28) |
| 93 | — | 14 | - (39) | 32 | . (86) | 14 | - (39) | 24 | | | 24 | - (39) | 24 | - (39) | 14 | - (39) | 32 | . (86) | 32 | . (86) |

TABLE II

GAIN IN SEPARATION BY USING REGISTRATION BEST FOR EACH CHARACTER COMPARED TO BL REGISTRATION

| CHARACTER | GAIN | CHARACTER | GAIN | CHARACTER | GAIN |
|---|---|---|---|---|---|
| A | 6 | 9 | 0 | ! | 11 |
| B | 14 | . | 0 | @ | 0 |
| C | 34 | , | 0 | # | 11 |
| D | 0 | - | 0 | $ | 0 |
| E | 16 | = | 36 | % | 7 |
| F | 0 | / | 0 | ¢ | 0 |
| G | 32 | ? | 10 | & | 10 |
| H | 0 | ; | 26 | * | 33 |
| I | 32 | : | 15 | ( | 11 |
| J | 0 | a | 10 | ) | 0 |
| K | 47 | b | 34 | + | 13 |
| L | 37 | c | 0 | ½ | 20 |
| M | 21 | d | 11 | ¼ | 6 |
| N | 2 | e | 0 | ' | 0 |
| O | 11 | f | 34 | " | 0 |
| P | 0 | g | 7 |  | 0 |
| Q | 0 | h | 22 | ÷ | 32 |
| R | 0 | i | 34 | ] | 38 |
| S | 5 | j | 0 | [ | 0 |
| T | 0 | k | 0 | ° | 0 |
| U | 2 | l | 32 | ± | 0 |
| V | 0 | m | 5 | § | 10 |
| W | 20 | n | 22 | — | 0 |
| X | 4 | o | 6 |  |  |
| Y | 0 | p | 0 |  |  |
| Z | 4 | q | 0 |  |  |
| 0 | 0 | r | 25 |  |  |
| 1 | 17 | s | 14 |  |  |
| 2 | 9 | t | 23 |  |  |
| 3 | 0 | u | 22 |  |  |
| 4 | 0 | v | 0 |  |  |
| 5 | 0 | w | 2 |  |  |
| 6 | 10 | x | 6 |  |  |
| 7 | 0 | y | 0 |  |  |
| 8 | 0 | z | 1 |  |  |

TABLE III

COMPARISON OF CLASSES WITH LEAST SEPARATION

| Character Pairs | Pairs By Table I Numbers | Separation for BL Registration | Separation for Best Registration | Separation Gain |
|---|---|---|---|---|
| ,-' | 38–84 | (28) | (28) | — |
| I-1 | 9–56* | 29 | 61 | 32 |
| ;-, | 43–38* | 30 | 56 | 26 |
| .-space | 37–86 | (31) | (31) | — |
| _-space | 93–86 | (32) | (32) | — |
| :-' | 44–84* | 34 | 49 | 15 |
| i-1 | 53–56* | 37 | 71 | 34 |
| F-P | 6–16* | 38 | 38 | — |
| 1-] | 28–88* | 21 | 56 | 17 |
| —-_ | 39–93 | (40) | (40) | — |
| =-_ | 40–93 | (43) | (79) | 36 |
| c-m | 47–57* | 47 | 47 | — |
| !-: | 71–44* | 48 | 59 | 11 |
| e-c | 49–47* | 50 | 50 | — |
| L-1 | 12–28* | 51 | 88 | 37 |
| n-u | 58–65* | 51 | 73 | 22 |
| f-1 | 50–28* | 53 | 87 | 34 |
| °-space | 90–86 | (56) | (56) | — |
| O-G | 15–7* | 58 | 69 | 11 |
| b-h | 46–52* | 58 | 92 | 34 |

* = Authentic Character Confusion

I claim:

1. A method of optical character recognition comprising:
   (1) storing in data processing memory conditions defining an image,
   (2) electronically comparing said stored image against a first identification model with said stored image in one perspective selected from perspectives referenced to a central area of said image and perspectives referenced to a border area of said image, and
   (3) electronically comparing said stored image against a second identification model with said stored image in a different perspective selected from perspectives referenced to a central area of said image and perspectives referenced to a border area of said image, said second identification model having identification information differing essentially from the identification information of said first identification model.

2. The method as in claim 1 in which said one perspective is by reference to a corner of said image and said different perspective is by reference to the center of said image.

3. A method of optical character recognition comprising:
   (1) storing in data processing memory conditions defining an image,
   (2) electronically comparing said stored image against a first probabilistic tree which is an identification model for a plurality of characters with said stored image in a first perspective,
   (3) electronically comparing said stored image against a second probabilistic tree which is an identification model for said plurality of characters with said stored image in a second perspective, and
   (4) selecting the character identified by giving greater significance to the character identified by one of said trees having more elements of difference at the perspective it was identified than the character identified by the other of said trees over other characters to be identified.

4. The method as in claim 3 in which said first perspective is by reference to a corner of said image and said second perspective is by reference to the center of said image.

5. An electronic, optical character recognition device comprising:
   (1) data processing memory means to store conditions defining an image corresponding to an image observed by electric means,
   (2) means to locate said stored image by reference to a first registration perspective,
   (3) means to locate said stored image by reference to a second registration perspective,
   (4) a first identification model,
   (5) a second identification model differing essentially in identification information from the identification information of said first identification model,
   (6) means to compare said stored image in said first perspective against said first identification model,
   (7) means to compare said stored image in said second perspective against said second identification model,
   (8) registration selection means having a first condition when said first identification model is to be compared and having a second condition when said second identification model is to be compared,
   (9) means responsive to said first condition of said registration selection means to enable said means to compare said image in said first perspective, and
   (10) means responsive to said second condition of said registration selection means to enable said means to compare said image in said second perspective.

6. The optical character recognition device according to claim 5 in which said means to locate locates said stored image at least by reference to a corner of said image and by reference to the center of said image, and said first registration perspective is said location by reference to a corner and said second registration perspective is said location by reference to the center.

7. The optical character recognition device according to claim 6 in which said registration perspectives comprise center, bottom left, middle left, top left, top middle, top right, middle right, bottom right and bottom center, and said means to compare compares said image in each of said perspectives against at least one identification model different from the identification model to which all the other different perspectives of the image are compared.

8. An electronic, optical character recognition device comprising:
   (1) data processing memory means to store conditions defining an image corresponding to an image observed by electric means,
   (2) means to locate said stored image by reference to a first registration perspective,
   (3) means to locate said stored image by reference to a second registration perspective,
   (4) a first identification model,
   (5) a second identification model,
   (6) means to compare said stored image in said first perspective against said first identification model, said first identification model having more elements of difference than said second identification model over characters to be identified when both are compared in said first perspective,
   (7) means to compare said stored image in said second perspective against said second identification model, said second identification model having more elements of difference than said first identification model over characters to be identified when both are compared in said second perspective,
   (8) registration selection means having a first condition when said first identification model is to be compared and having a second condition when said second identification model is to be compared,
   (9) means responsive to said first condition of said registration selection means to enable said means to compare said image in said first perspective, and
   (10) means responsive to said second condition of said registration selection means to enable said means to compare said image in said second perspective.

9. The optical character recognition device according to claim 8 in which said means to locate locates said stored image at least by reference to a corner of said image and by reference to the center of said image, and said first registration perspective is said location by reference to a corner and said second registration perspective is said location by reference to the center.

10. The optical character recognition device according to claim 9 in which said registration perspectives comprise center, bottom left, middle left, top left, top middle, top right, middle right, bottom right and bottom center, and said means to compare compares said image in each of said perspectives against at least one identification model different from the identification model to which all the other different perspectives of the image are compared, each identification model being compared to the perspective for which it has more elements of difference than the other models over images to be identified other than that to be identified by the model being compared.

11. An electronic, optical character recognition device comprising:
   (1) data processing memory means to store conditions defining an image corresponding to an image observed by electric means,
   (2) means to locate said stored image by reference to a first registration perspective,
   (3) means to locate said stored image by reference to a second registration perspective,
   (4) a first probabilistic tree operative as an identification model to identify a plurality of characters,
   (5) a second probabilistic tree operative as an identification model to identify said plurality of characters,
   (6) means to compare said stored image in said first perspective against said first probabilistic tree and to signal the identity of a character identified,
   (7) means to compare said stored image in said second perspective against said second probabilistic tree and to signal the identity of a character identified,
   (8) registration selection means having a first condition when said first probabilistic tree is to be compared and having a second condition when said second identification model is to be compared,
   (9) means responsive to said first condition of said registration selection means to enable said means to compare said image in said first perspective,
   (10) means responsive to said second condition of said registration selection means to enable said means to compare said image in said second perspective, and
   (11) means signalling one character identified in accordance with a selection favoring the result of the said means to compare which identified a character having more elements of difference than the character identified by the other said means to compare over other characters to be identified.

12. The optical character recognition device according to claim 11 in which said means to locate locates said stored image at least by reference to a corner of said image and by reference to the center of said image, and said first registration perspective is said location by reference to a corner and said second registration perspective is said location by reference to the center.

* * * * *